(12) United States Patent  
Sites

(10) Patent No.: US 6,408,092 B1  
(45) Date of Patent: Jun. 18, 2002

(54) HANDWRITTEN INPUT IN A RESTRICTED AREA

(75) Inventor: Richard L. Sites, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/144,368

(22) Filed: Aug. 31, 1998

(51) Int. Cl.$^7$ ................................................ G06K 9/00
(52) U.S. Cl. ...................... 382/187; 382/188; 382/314; 345/158; 345/169; 345/179; 707/541
(58) Field of Search ................................ 382/175–179, 382/186–189, 314; 345/158, 173, 473, 178–180, 47; 707/541

(56) References Cited

U.S. PATENT DOCUMENTS

| | | | | |
|---|---|---|---|---|
| 4,972,496 A | | 11/1990 | Sklarew ........................ 382/13 |
| 5,049,862 A | | 9/1991 | Dao et al. .................... 340/706 |
| 5,454,046 A | * | 9/1995 | Carmen, II ................. 382/186 |
| 5,583,980 A | * | 12/1996 | Anderson .................... 345/473 |
| 5,652,806 A | * | 7/1997 | Friend ........................ 382/175 |
| 5,737,443 A | * | 4/1998 | Guzik et al. ................ 382/188 |
| 5,754,169 A | * | 5/1998 | Yashiro ....................... 345/173 |
| 5,818,425 A | * | 10/1998 | Want et al. ................. 345/158 |
| 5,870,492 A | * | 2/1999 | Shimizu et al. ............. 382/187 |
| 5,953,541 A | * | 9/1999 | King et al. .................... 710/67 |
| 6,011,554 A | * | 1/2000 | King et al. ................. 345/352 |
| 6,167,411 A | * | 12/2000 | Narayanaswamy ......... 707/541 |

OTHER PUBLICATIONS

"Wisdom Pen, Chinese Hand–writing Recognition System," Newest Release Version 3.0, Alestron Inc., 2 pgs., downloaded from www. Aug. 30, 1998.

W. Zhao, "Solving the Chinese Puzzle," BYTE Magazine, 2 pgs., Jul. 1996, downloaded from www.

"Chinese Handwriting Recognition System," Motorola, Wisdom Pen product information, 3 pgs., downloaded from www. Aug. 30, 1998.

"Jot™ 2.0 for Microsoft Windows CE 2.0 Handheld Platform," Communication Intelligence Corp., 3 pgs., downloaded from www. Jul. 26, 1998.

"Forms solutions for the 3Com PalmPilot organizer and IBM WorkPad PC companion," 4 pgs., downloaded from www. Aug. 30, 1998.

* cited by examiner

Primary Examiner—Jose L. Couso  
Assistant Examiner—Gregory Desire  
(74) Attorney, Agent, or Firm—Fish & Richardson P.C.

(57) ABSTRACT

Methods and apparatus implementing a technique for processing handwritten marks made on a machine-readable tablet. The technique includes providing multiple regions for input on the tablet; receiving from a user handwritten marks made in a current region of the plurality of regions; receiving from the user an indication that the current region is complete and thereupon selecting a different one of the plurality of regions as the current region in which to receive handwritten marks made by the user, whereby marks are received in a sequence of at least two regions; and representing the handwritten input as the aggregate of the marks written in the sequence of regions in a writing direction, the marks in different input regions having positions with respect to each other defined by a logical concatenation of the regions on the sequence of regions. The input can be arbitrarily-long markings of any kind.

39 Claims, 2 Drawing Sheets

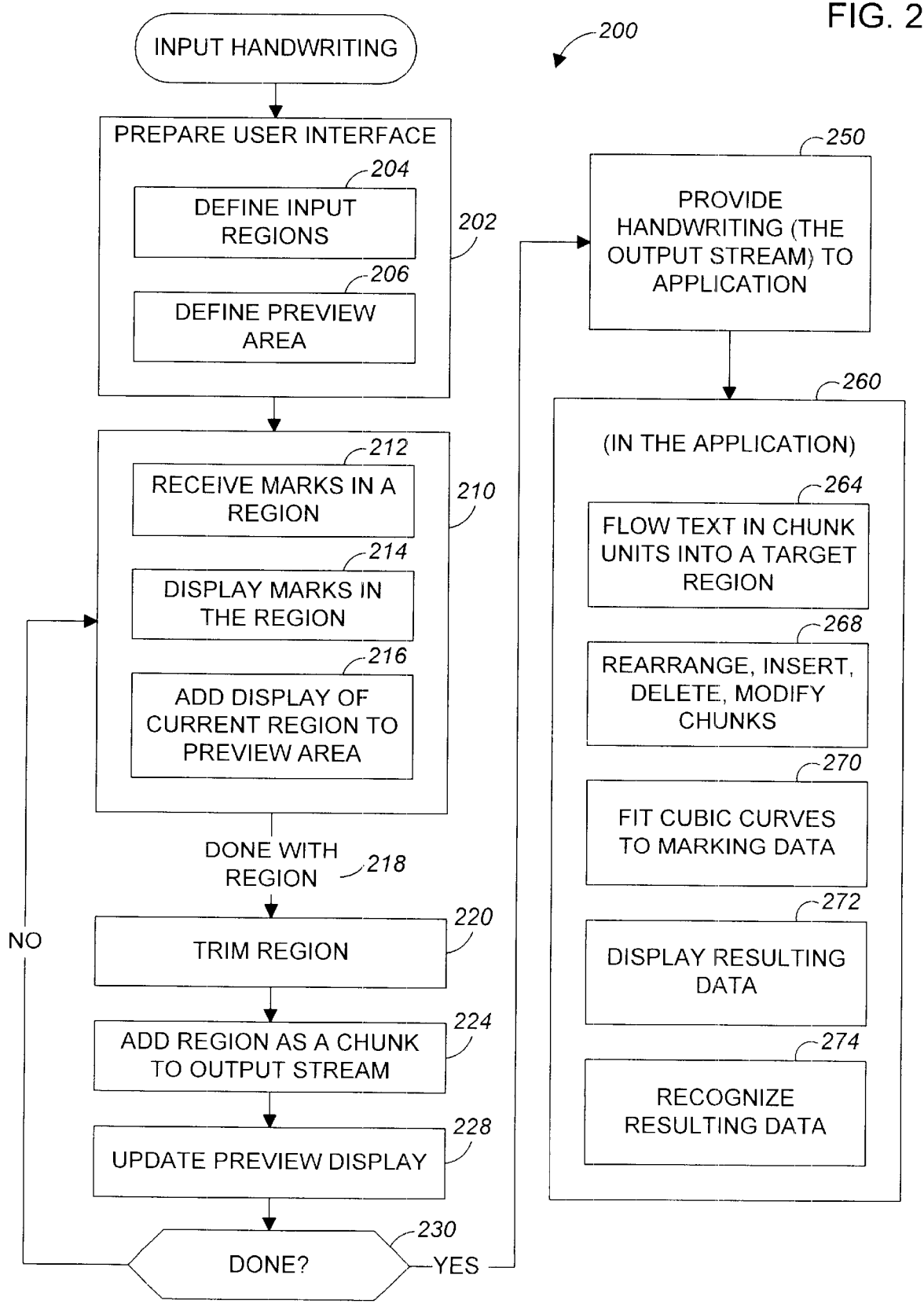

HANDWRITTEN INPUT IN A RESTRICTED AREA

BACKGROUND OF THE INVENTION

The present invention relates to digital electronic systems that receive and use handwritten input in the nature of text.

Handwritten computer input has traditionally been captured using a stylus and a graphics tablet. Graphics tablets have a flat surface on which a user makes marks with the stylus that become electronic signals representing the successive positions of the stylus on the active area of the tablet. Many tablets, such as the graphics tablet products available from Wacom Technology Corporation of Vancouver, Wash., are pressure sensitive and provide pressure data along with position data. The Wacom tablets include tablets ranging in size from 4×5 to 18×25 (inches) and provide 256 levels (that is, eight bits) of pressure sensitivity. Other vendors provide larger and smaller tablets as well as tablets of different pressure sensitivity. Such tablets are generally connected to a personal computer to provide a superset of the functionality available with a mouse. In this configuration, position and pressure data are transmitted to an operating system or application program that ultimately generates display data on a display screen in response to gestures the user makes with the stylus on the tablet.

An input tablet can also be integrated with a display device, such as a liquid crystal display device. Such display tablets are well known from their use in personal digital assistant (PDA) devices such as the PalmPilot™ and Palm III™ organizers available from 3Com Corporation of Santa Clara, Calif. The input tablets on these devices are characteristically small, having an active area with a width on the order of two to two and one-half inches in the direction in which the user generally writes.

An input tablet can also be integrated with a keyboard or notebook computer, or added to a computer as a separate device, as a substitute for a mouse or other pointing device. In some products, such input tablets are also pressure sensitive.

With some input devices and software, marks made on a tablet can be erased or edited after they are made. The Wacom Erasing DuoSwitch® UltraPen® stylus, for example, has an eraser end that can be recognized as an eraser by device driver software and application software. Input tablets that are used as substitutes for a mouse generally support click and double-click functions. PDA devices generally support editing functions that can be invoked by gestures made by the user on the device's display tablet, either in the form of editing marks drawn on the tablet or in the form of gestures that select editing buttons.

SUMMARY OF THE INVENTION

Handwritten input in the nature of text is generally written in lines of script or characters, either horizontally or vertically, and either left-to-right or right-to-left. The length of a handwritten input can easily exceed the writing width available on an input tablet. The invention provides methods and apparatus that allow a person using an input tablet—in particular, a small tablet of the kind often found on a PDA device or a notebook computer—to write and edit arbitrarily long text in a restricted area.

In general, in one aspect, the invention features methods and apparatus implementing a technique for processing handwritten marks made on a machine-readable tablet. The technique includes providing multiple regions for input on the tablet; receiving from a user handwritten marks made in a current region of the plurality of regions; receiving from the user an indication that the current region is complete and thereupon selecting a different one of the plurality of regions as the current region in which to receive handwritten marks made by the user, whereby marks are received in a sequence of at least two regions; and representing the handwritten input as the aggregate of the marks written in the sequence of regions in a writing direction, the marks in different input regions having positions with respect to each other defined by a logical concatenation of the regions on the sequence of regions. The input can be arbitrarily-long markings of any kind.

Advantageous implementations of the invention include one or more of the following features. A bounding box is defined for each input region and the bounding boxes are logically concatenated to define the positions of the marks in different input regions with respect to each other. Each bounding box has a length in the writing direction, which length is defined dynamically to fit the marks made in the region. Each bounding box has a width perpendicular to the writing direction, which width is the same for all bounding boxes. The bounding box for each input region has a leading boundary the position of which is fixed with respect to the input region and a trailing boundary the position of which varies with respect to the input region to accommodate the marks made in the input region. The input regions and the sequence of input regions have a writing direction but no other predefined structure with respect to the marks to be made within the input regions. The logical concatenation of regions includes logically concatenating a trailing edge of one region to a leading edge of an immediately subsequent region. The writing direction is horizontal or vertical.

Handwritten marks can be received at any place and in any arbitrary order within the current region. Handwritten marks are displayed substantially simultaneously with the making of the marks. Handwritten marks are stored as mark data in a memory operatively coupled to the tablet, and the stored mark data is combined to form the representation of the handwritten input. The mark data represents the marks made by the user as set of times and positions of a stylus on the tablet. Both a recently-written portion of the handwritten marks as made by the user and the marks made by the user in the current region are displayed while marks are being made in the current region. The tablet is a display tablet having an integrated display device. The recently-written portion of the handwritten marks as made by the user is displayed at a reduced size in a reviewing area on the display device. Unmarked space is logically trimmed from one end but not from the opposite end of each of the regions before logically concatenating the one end of the region with a sequentially neighboring region. The plurality of regions consists of two regions, and the user indicates that the current one of the two regions is complete by making a mark in the other one of the two regions. The display of the current region is cleared after the user indicates that the current region is complete. Handwritten marks can include editing marks such as marks denoting a modification of marks previously made in the current region. The modification can be erasure. The handwritten input can be a signature. The tablet has an active area with a length of less than about two and one-half inches in a writing direction. The marks written in each region in the sequence of regions are combined in an output stream as a chunk of data. This output stream includes a sequence of chunks, and the locations of bounding box boundaries are specified in the output stream. The handwritten input is displayed in lines that break at input region boundaries. The marks are received in a first region and a second region alternately and concatenated logically to an output stream. The mark data in the output stream are displayed by reflowing the mark data in units of chunks in a display area. The display area is a rectangular area defined within an electronic document. The sequence of chunks can be edited by deleting a chunk, by inserting a chunk, by replacing a chunk, by modifying a chunk, or by rearranging chunks.

Advantages that may be seen in implementations of the invention include one or more of the following. The invention allows a person to write and edit text comfortably and reliably, even when the input area is restricted. The invention allows a person to enter a signature comfortably in a restricted area. The use of input regions imposes no constraints on what can be written or on the interpretation of what is written.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 is a flowchart of a method for receiving and processing handwritten markings in accordance with the invention.

DETAILED DESCRIPTION

Figure 1:
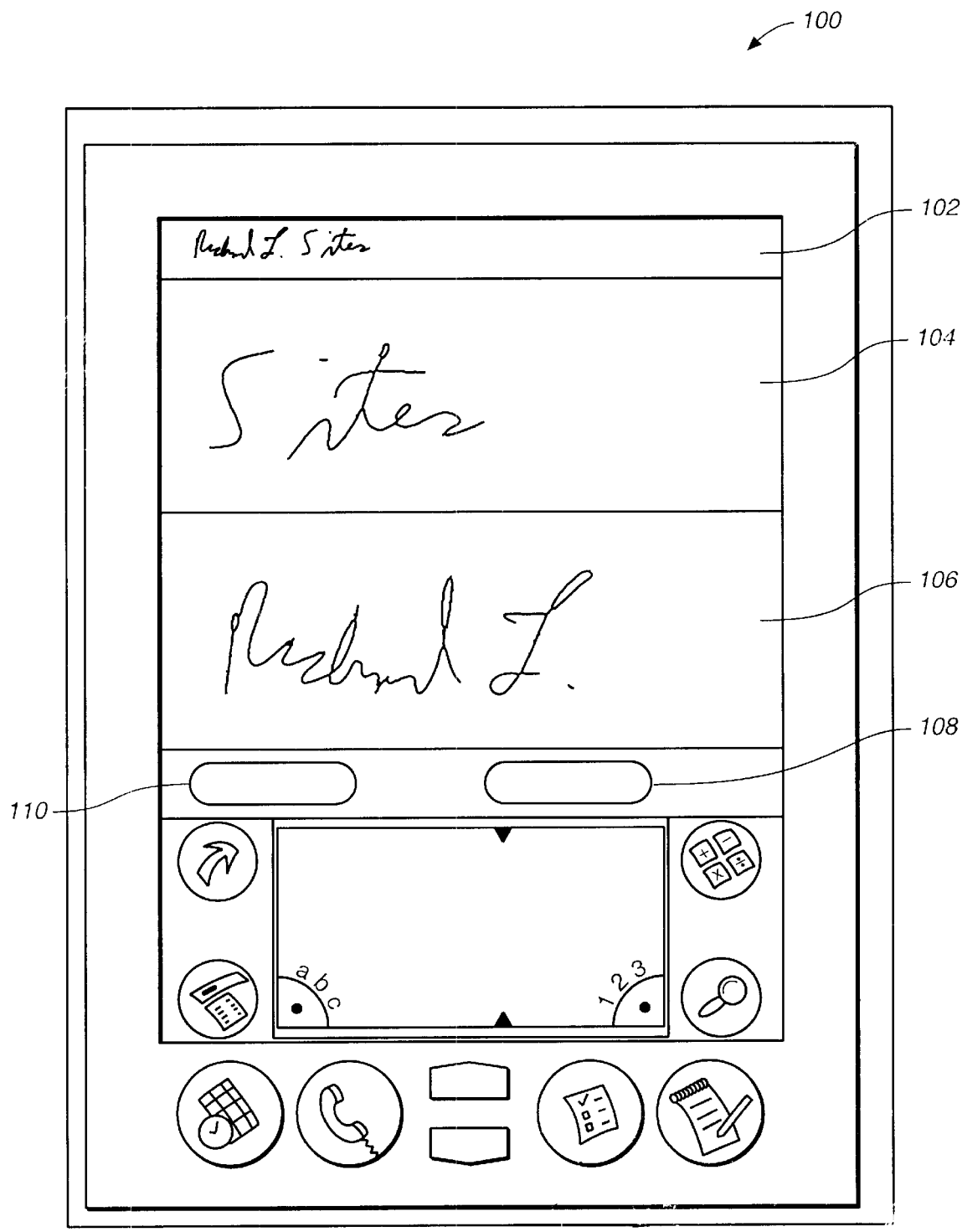
FIG. 1 is a diagram of a personal digital assistant showing a user interface in accordance with the invention.

FIG. 1 is a diagram of a personal digital assistant (PDA) 100 showing a user interface in accordance with the invention. The PDA is a small, self-contained computer that has a microprocessor, memory, input and output devices, and interfaces for add-on devices. The PDA 100 runs an operating system that provides functionality and services for applications, that is, for computer programs configured to run on the PDA.

As will be described in reference to both FIG. 1 and FIG. 2, the display tablet of the PDA is controlled by software (computer program instructions) executed by the microprocessor and other elements of the PDA. The software implements a process 200 (FIG. 2) that prepares the user interface shown on the display tablet for handwritten input (step 202) by defining input regions 104 and 106 in the input or active area of the display tablet (step 204). Two regions are sufficient, although more can be used, and the regions need only be high enough (for horizontal writing) or wide enough (for vertical writing) to allow a user to write one line height (or width) comfortably. Optionally, the process can define a reviewing area 102 for the user interface (step 206). The reviewing area 102 is used to display, in a reduced size, what the user has most recently written. Displaying the recent writing at one-fourth scale in the reviewing area provides good visual feedback to the user.

The process 200 can be invoked by, or implemented in, any program running on the PDA that requires or can accept handwritten input. After having prepared the user interface, the process receives input (step 210) in the form of marks made by the user on the tablet in one of the regions (step 212). The process displays the marks on the display tablet where the marks were made (step 214) as the marks are made; or, if the input tablet is not a display tablet, the process can display the marks on a monitor or other display device connected to the computer running the process. If a reviewing area has been defined, the marks made in the current region are also displayed in the reviewing area.

Having begun writing in one of the input regions, the user can continue writing in the region by making marks at any place and in any order within the region. Thus, the user can go back and dot i's and cross t's. If the underlying operating system or application software supports erasure or other editing of marks on the input tablet, the user can use all supported forms of erasure and editing. The user can start over in the region by clicking the "clear" button 108 (FIG. 1), which causes the process to erase the region and allow the user to begin writing again. When the user is done with the current input region, the user can so indicate by making a mark in a different one of the input regions (step 218). The process then optionally trims the completed region (step 220) by logically trimming unmarked space from one end but not from the opposite end of the region before adding the marks in the region to an output stream. By trimming the unmarked space from the right of the region but not the left, the process allows the user to insert space intentionally within the writing by leaving blank space at the left of a region, while not compelling the user to write all the way to the right margin to avoid inserting unintended space. This provides a natural writing interface for a user writing left-to-right, and the same technique can be used, mutatis mutandis, for writing that runs in any other direction.

The trimming can be accomplished by defining a bounding box for each input region. To define the positions of the handwritten marks from different input regions with respect to each other, the bounding boxes are logically concatenated. The length of each bounding box in the writing direction is defined dynamically to fit the marks made in the corresponding input region. The width of each bounding box perpendicular to the writing direction is advantageously set to be the same for all bounding boxes and the same as the width of the input region. To define the length dynamically, the bounding box for each input region has a leading boundary the position of which is fixed with respect to the input region and a trailing boundary the position of which varies with respect to the input region to accommodate the marks made in the input region. As each input region is used or reused, a new bounding box is defined for the marks newly made in the region.

The trimmed region defines a chunk of data, which is added to the output stream (step 224). The display of marks in the reviewing region also reflects the trimming of the region (step 228). In this way, the region just completed is logically concatenated with the sequentially preceding region, and all neighboring regions are logically concatenated to form a representation of the user's handwritten input.

If the user has more marks to make, the process continues (the "no" branch from decision step 230) by repeating the actions of receiving marks (now in the newly selected region), displaying the marks in the region, and displaying the marks in the reviewing area (collectively, step 210).

In FIG. 1, the input regions 104 and 106 and the reviewing area 102 are shown as displaying a signature that was begun in input region 106 and completed in input region 104. In actual operation, the process would not display the handwritten marks in both input regions as shown. The process clears the display of the current region after the user indicates that the current region is complete.

The user can indicate that both the current region and the entire input sequence are complete by selecting the "done"

button 110 (FIG. 1) on the user interface. When this occurs, the last region can be, but need not be, trimmed (step 220), as has been described. It is then added to the output stream. The process then provides the entire output stream to a program—typically, an application that requested the input (step 250 and "yes" branch of decision step 230).

The markings made by the user are stored as data in a random access memory of the PDA under control of the application and operating software of the device. The data typically takes the form of sample times and corresponding positions and pressures, if the device is pressure sensitive.

The output stream is maintained in memory in the PDA. The output stream is stored using a data structure, such as a linked list, that maintains the separate identity of the chunks, thereby preserving region boundary information and allowing programs that receive and process the output stream to process the output stream in chunk units. Alternatively, the output stream can be stored as a linear array or list of sample points with additional data specifying the location of region (that is, chunk) boundaries.

The output stream can be processed by an application program running on the device that received the handwriting or by an application program on a different computer that receives the output stream data. For example, an output stream in a Palm III organizer can be transmitted to a personal computer (step 250), such as a computer running the Microsoft® Windows® 95 operating system or the Apple Computer Macintosh® operating system, using the Palm Computing® Palm OS HotSync® architecture.

An application program can manipulate the output stream data in a number of useful ways (step 260). The application can fit cubic curves, such as Bézier curves, and splines to the data (step 270). The application can express the data in a page description language, such as the PostScript® language, by fitting the sample data points to drawing elements supported by the language, and the page description language representation can be rendered for display or printing (step 272). The application can display the data in any of the foregoing forms in a target region, such as a rectangular region within an electronic document, flowing the data into the target region in chunk units, which will cause the displayed representation of the handwriting to have line breaks only at the original input-region boundaries (step 264). Pressure data, if available, can be used to vary the thickness of displayed lines and curves.

The application can edit the sequence of chunks in the output stream by deleting a chunk, by inserting a chunk, by replacing a chunk, and by rearranging chunks (step 268). Either as a set of points or in a vector representation, each individual chunk can be edited using bitmap or vector oriented editing tools.

The application can also apply a handwriting recognition process to the output stream data to convert the markings data into text data (step 274).

The process 200 can be implemented using commonly-available software development tools for the platform or platforms on which the computer programs implementing the process are to run.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired. The language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A suitable programmable processing system for implementing apparatus or performing methods of the invention includes a processor, a random access memory (RAM), a program memory (for example, a writable read-only memory (ROM) such as a flash ROM), an input tablet controller, a display device controller, and an input/output (I/O) controller coupled by a processor (CPU) bus. The system can be preprogrammed in ROM or it can be programmed (and reprogrammed) by loading a program from another source.

The invention has been described in terms of particular embodiments. Other embodiments are within the scope of the following claims. For example, the steps of the invention can be performed in a different order and still achieve desirable results. The input regions and reviewing area have been illustrated as running horizontally. For input in languages written vertically, the input regions and reviewing area would run from top to bottom on the input tablet. The tablet can be an input-only device and the marks made by the user can be displayed on a different device. The invention can be implemented on a palm, notebook, desktop, or other form of a computer. The sampling of the input tablet can be done at a variable rate as well as a fixed rate. A completed region can be trimmed to a bounding box around the markings, or the two ends of the bounding box perpendicular to the writing direction can be trimmed while leaving the sides of the bounding box parallel to the writing direction fixed. A trailing edge strip of the current region can be reproduced at the leading edge margin of what will be the next region so that the user can align and join markings across region boundaries easily and accurately. If the user does join marks across region boundaries, the pair of regions can be treated as a single chunk when reflowing the output stream. The bounding box, or markers identifying the locations of one or more sides of the bounding box, and in particular a marker identifying the location of the trailing edge side of the bounding box, can be displayed with the marks made by the user. The reviewing area can be implemented with scrolling, so that the user can scroll to and select a chunk of data, display it, edit it, and restore it to the output stream.

What is claimed is:

1. A method for processing handwritten input received as marks made on a machine-readable tablet, comprising:

providing a plurality of predefined regions for input on the tablet;

receiving from a user handwritten marks made in a current region of the plurality of predefined regions;

receiving from the user an indication that the marks in the current region are complete and thereupon providing a different one of the plurality of predefined regions as the current region in which to receive handwritten marks made by the user, whereby completed marks are received in a sequence of at least two regions;

repeating the acts of receiving marks and providing a different region until the user indicates that the handwritten input is complete, wherein a region can be reused as a current region without overwriting marks previously made by the user in the region when it was previously the current region; and representing the handwritten input as a concatenation of the completed marks as written in the sequence of regions, the completed marks being concatenated in a writing direction, the completed marks having positions with respect to each other defined by a logical concatenation of their respective regions in the sequence in which regions were marked.

2. The method of claim 1, further comprising:

defining a bounding box for each region and logically concatenating the bounding boxes to define the positions of the completed marks in different regions with respect to each other.

3. The method of claim 2, wherein:

each bounding box has a length in the writing direction, which length is defined dynamically to fit the marks made in the region.

4. The method of claim 3, wherein:

the bounding box for each region has a leading boundary, the position of which is fixed with respect to the region, and a trailing boundary, the position of which varies with respect to the region to accommodate the marks made in the region.

5. The method of claim 3, wherein:

representing the handwritten input comprises combining in an output stream mark data derived from each region as a chunk of data to form a sequence of chunks with the locations of bounding box boundaries being specified in the output stream.

6. The method of claim 5; wherein:

the tablet is a display tablet integrating an input tablet and a display device;

the plurality of predefined regions consists of two predefined regions; and the user indicates that the current one of the two regions is complete by making a mark in the other one of the two regions; the method further comprising:

receiving handwritten marks at any place and in any arbitrary order within the current region;

displaying a recently-written portion of the handwritten marks at a reduced size in a reviewing area on the display device;

displaying on the display device the handwritten marks made by the user in the current region substantially simultaneously with the making of the marks;

clearing the display of the current region after the user indicates that the current region is complete;

storing the received handwritten marks as mark data in a memory operatively coupled to the tablet; and combining the stored mark data from each region as a chunk in the output stream.

7. The method of claim 2, wherein:

each bounding box has a width perpendicular to the writing direction, which width is the same for all bounding boxes.

8. The method of claim 1, wherein the regions have a writing direction but no other predefined structure with respect to the marks to be made within the regions.

9. The method of claim 1, wherein the logical concatenation of regions comprises logically concatenating a trailing edge of one region to a leading edge of an immediately subsequent region.

10. The method of claim 1, wherein the writing direction defines the direction in which groups of characters are written and read; and the writing direction is horizontal.

11. The method of claim 1, wherein the writing direction defines the direction in which groups of characters are written and read; and the writing direction is vertical.

12. The method of claim 1, further comprising:

receiving handwritten marks at any place and in any arbitrary order within the current region.

13. The method of claim 1, further comprising:

displaying a representation of the handwritten marks being made in the current region substantially simultaneously with the making of the marks.

14. The method of claim 1, further comprising:

storing the handwritten marks as mark data in a memory operatively coupled to the tablet; and combining the stored mark data to form the representation of the handwritten input.

15. The method of claim 14, wherein:

the mark data represents the marks made by the user as set of times and positions of a stylus on the tablet.

16. The method of claim 14, further comprising:

displaying a recently-written portion of the handwritten marks as made by the user and displaying the marks made by the user in the current region while marks are being made in the current region.

17. The method of claim 16, wherein the tablet is a display tablet having an integrated display device, the method further comprising:

displaying on the display device both the recently-written portion of the handwritten marks as made by the user and the marks being made in the current region.

18. The method of claim 17, wherein displaying the recently-written portion of the handwritten marks comprises:

displaying the recently-written portion of the handwritten marks at a reduced size in a reviewing area on the display device.

19. The method of claim 1, wherein:

logical concatenation of the sequence of regions comprises logically trimming unmarked space from one end but not from the opposite end of each of the regions before logically concatenating the one end of the region with a sequentially neighboring region.

20. The method of claim 1, wherein:

the plurality of regions consists of two regions; and the user indicates that the current one of the two regions is complete by making a mark in the other one of the two regions.

21. The method of claim 20, wherein the tablet is a display tablet having an integrated display device, the method further comprising:

displaying on the display device a representation of the handwritten marks being made in the current region substantially simultaneously with the making of the marks; and clearing the display of the current region after the user indicates that the current region is complete.

22. The method of claim 1, wherein:

receiving handwritten marks in the current region includes receiving editing marks including marks denoting a modification of marks previously made in the current region.

23. The method of claim 22, wherein:

the modification is erasure.

24. The method of claim 1, wherein:

the handwritten input is a signature.

25. The method of claim 1, wherein:

the tablet has an active area with a length of less than about two and one-half inches in the writing direction.

26. The method of claim 1, further comprising:

displaying the handwritten input in lines that break at the region boundaries.

27. The method of claim 1, wherein the plurality of regions consists of a first region and a second region, the method further comprising:

receiving marks in the first region and the second region alternately and concatenating to an output stream mark data derived from each region as a chunk of data to form a sequence of chunks.

28. The method of claim 27, further comprising:

displaying the mark data in the output stream by reflowing the mark data in units of chunks in a display area.

29. The method of claim 28, wherein the display area is a rectangular area defined within an electronic document.

30. The method of claim 27, further comprising:

editing the sequence of chunks by deleting a chunk, by inserting a chunk, by replacing a chunk, by modifying a chunk, or by rearranging chunks.

31. Apparatus comprising a storage medium tangibly embodying program instructions operable for causing a programmable processor to:

provide a plurality of predefined regions for input on the tablet;

receive from a user handwritten marks made in a current region of the plurality of predefined regions;

receive from the user an indication that the marks in the current region are complete and thereupon provide a different one of the plurality of predefined regions as the current region in which to receive handwritten marks made by the user, whereby completed marks are received in a sequence of at least two regions;

repeat the acts of receiving marks and providing a different region until the user indicates that the handwritten input is complete, wherein a region can be reused as a current region without overwriting marks previously made by the user in the region when it was previously the current region; and represent the handwritten input as a concatenation of the completed marks as written in the sequence of regions, the completed marks being concatenated in a writing direction, the completed marks having positions with respect to each other defined by a logical concatenation of their respective regions in the sequence in which regions were marked.

32. The apparatus of claim 31, further comprising instructions operable for causing a programmable processor to perform the method of claim 30.

33. The apparatus of claim 31 further comprising instructions operable for causing a programmable processor to:

define a bounding box for each region and logically concatenating the bounding boxes to define the positions of the completed marks in different regions with respect to each other.

34. The apparatus of claim 31, wherein the regions have a writing direction but no other predefined structure with respect to the marks to be made within the regions.

35. The apparatus of claim 31, wherein the logical concatenation of regions comprises logically concatenating a trailing edge of one region to a leading edge of an immediately subsequent region.

36. The apparatus of claim 31, further comprising instructions to:

receive handwritten marks at any place and in any arbitrary order within the current region.

37. The apparatus of claim 31, further comprising instructions to:

display a representation of the handwritten marks being made in the current region substantially simultaneously with the making of the marks.

38. The apparatus of claim 31, wherein:

the plurality of regions consists of two regions; and the user indicates that the current one of the two regions is complete by making a mark in the other one of the two regions.

39. The apparatus of claim 31, wherein the plurality of regions consists of a first region and a second region, the apparatus further comprising instructions to:

receive marks in the first region and the second region alternately and concatenate to an output stream mark data derived from each region as a chunk of data to form a sequence of chunks.

* * * * *

UNITED STATES PATENT AND TRADEMARK OFFICE
CERTIFICATE OF CORRECTION

PATENT NO.      : 6,408,092 B1                                                    Page 1 of 1
DATED           : June 18, 2002
INVENTOR(S)     : Richard L. Sites It is certified that error appears in the above-identified patent and that said Letters Patent is hereby corrected as shown below:

<u>Title page,</u>
Item [56], References Cited, U.S. PATENT DOCUMENTS, please correct the following: "5,953,541 A *  9/1999  King et al  710/67" to be:
-- 5,953,541 A *    12/1999    King et al.    710/67 --

Signed and Sealed this

Second Day of September, 2003

JAMES E. ROGAN
*Director of the United States Patent and Trademark Office*